United States Patent
Zhou

(10) Patent No.: US 9,329,320 B2
(45) Date of Patent: May 3, 2016

(54) LIGHT GUIDE PLATE, BACKLIGHT MODULE AND DISPLAY DEVICE

(71) Applicant: BOE TECHNOLOGY GROUP CO., LTD., Beijing (CN)

(72) Inventor: Shanshan Zhou, Beijing (CN)

(73) Assignee: BOE TECHNOLOGY GROUP CO., LTD. (CN)

( * ) Notice: Subject to any disclaimer, the term of this patent is extended or adjusted under 35 U.S.C. 154(b) by 311 days.

(21) Appl. No.: 14/079,233

(22) Filed: Nov. 13, 2013

(65) Prior Publication Data

US 2014/0153286 A1 Jun. 5, 2014

(30) Foreign Application Priority Data

Nov. 15, 2012 (CN) .......................... 2012 1 0460620

(51) Int. Cl.
*F21V 8/00* (2006.01)

(52) U.S. Cl.
CPC ............ *G02B 6/0018* (2013.01); *G02B 6/0021* (2013.01); *G02B 6/0023* (2013.01)

(58) Field of Classification Search
CPC ... G02B 6/0018; G02B 6/0021; G02B 6/0023
See application file for complete search history.

(56) References Cited

U.S. PATENT DOCUMENTS

| 2009/0040768 A1 | 2/2009 | Zhu et al. |
| 2011/0090672 A1* | 4/2011 | Zhu ...................... G02B 6/0018 362/97.1 |

FOREIGN PATENT DOCUMENTS

| CN | 101029376 | 9/2007 |
| CN | 101100379 | 1/2008 |
| CN | 102042562 | 5/2011 |
| CN | 102628580 | 8/2012 |

OTHER PUBLICATIONS

P.R. China, Third Office Action, App. No. 201210460620.4, Oct. 28, 2014.
Office Action issued in corresponding Chinese Application No. 201210460620.4 dated Aug. 14, 2013.
Office Action issued in corresponding Chinese Application No. 201210460620.4 dated May 5, 2014.
Office Action and Decision of Rejection issued in corresponding Chinese Application No. 201210460620.4 dated Mar. 25, 2015.

* cited by examiner

*Primary Examiner* — Thomas M Sember
(74) *Attorney, Agent, or Firm* — Baker Hostetler LLP

(57) ABSTRACT

The present invention is directed to a light guide plate, a backlight module and a display device with the light guide plate comprising a bottom surface containing space for holding light sources, a light emitting surface opposite the bottom surface and a quantum dot layer arranged in the containing space in the direction of the light emitting surface. Since the bottom surface of the light guide plate is provided with the containing space for holding the light sources, and the light sources are limited within the containing space, light diffusion due to the fact that the light sources are positioned outside the light guide plate is reduced, loss of light is reduced, and quantity of the light sources in the backlight module is reduced. Since the quantum dot layer is arranged in the containing space toward a direction of the light emitting surface, white mixed light is formed according to fluorescent effect of quantum dot materials. Further, as the quantum dots have the characteristics of high color gamut and high transmittance, display effect can be improved.

20 Claims, 4 Drawing Sheets

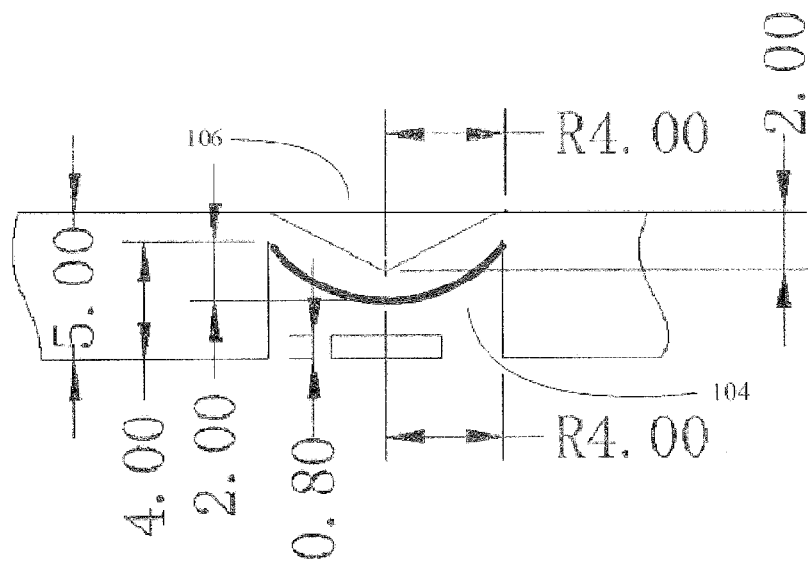

LIGHT GUIDE PLATE, BACKLIGHT MODULE AND DISPLAY DEVICE

CROSS REFERENCE

This application claims priority of the Chinese Patent Application No. 201210460620.4, filed in China on Nov. 15, 2012, which is hereby incorporated by reference in its entirety into this application.

TECHNICAL FIELD

Examples of the present invention relate to a display technical field, and more particularly to a light guide plate, a backlight module and a display device.

BACKGROUND

Liquid Crystal Display (LCD) does not emit light of its own and, in order to make the contents displayed on the LCD clearly seen, it needs the support of a backlight module to get the color. A side-type backlight module generally consists of necessary optical components such as light sources, a diaphragm, a reflector sheet, a light guide plate, and a rear panel.

The light sources of the side-type backlight module are arranged at the side of the light guide plate, and light emitted from the light sources directly enters the light guide plate, and travels from the side of the light guide plate to the other end, and when the light reaches a diffusion point, it is scattered at all angles and then exits through a light exit surface of the light guide plate. The main function of the light guide plate is to convert incident light into planar light, and then diffuse the light emitted from the light guide plate and deviate it from the direction, and finally gather the light in the normal direction of a display surface and adjust the divergence angle of the light through two light-condensing prism sheets whose surfaces are in the form of continuous zigzag grooves.

As to the side-type backlight module, light emitting diodes (LEDs) are usually used as the light sources. As the LEDs have a certain divergence angle, when the number of the LEDs is reduced, due to their loose arrangement, non-uniform brightness tends to appear at the light incoming side, i.e., a hot spot phenomenon, and due to non-uniform brightness at the light incoming side, the whole brightness of the backlight module will be non-uniform.

Besides, since the light sources of the current side-type backlight module are arranged at one side of the light guide plate, there exists the problem that the color gamut and transmittance of light are not high, thereby reducing the display effect.

SUMMARY

The technical problem to be solved by the examples of the present invention is that: since the light sources of the current side-type backlight module are arranged at one side of the light guide plate, there exists the problem that the color gamut and transmittance of light are not high, thereby reducing the display effect.

In order to solve the above technical problem, an example of the present invention provides a light guide plate comprising a bottom surface and a light emitting surface opposite to the bottom surface, wherein the bottom surface is provided with a containing space for holding light sources, and a quantum dot layer is arranged in the containing space toward a direction of the light emitting surface.

In the above light guide plate, the light emitting surface is provided with a groove at a position opposite to the containing space, and the sectional area of the groove at a position close to the light emitting surface is larger than its sectional area at a position far away from the light emitting surface.

In the above light guide plate, the groove is in the form of an inverted cone and the bottom surface of the inverted-conical groove is close to the light emitting surface.

In the above light guide plate, the containing space is located at an end portion of the bottom surface.

In the above light guide plate, the light guide plate further comprises a first side surface which is connected to both the light emitting surface and the bottom surface, and the containing space is located at a position where the bottom surface and the first side surface are connected.

In the above light guide plate, the containing space is provided with a convex surface in the direction of facing toward the light sources.

In the above light guide plate, the projection area of the convex surface is smaller than or equal to the projection area of the groove.

In the above light guide plate, the quantum dot layer is coated on the convex surface and areas near the convex surface.

In the above light guide plate, the size of quantum dots in the quantum dot layer is 550 nm to 650 nm.

An example of the present invention further provides a backlight module, comprising the light guide plate, and light sources which are held in the containing space on the bottom surface of the light guide plate.

An example of the present invention further provides a display device, comprising the backlight module, and a display panel which is arranged in the light exit direction of the light guide plate in the backlight module.

The above technical solutions of the examples of the present invention have the following advantageous effects: since the bottom surface of the light guide plate of the examples of the present invention is provided with the containing space for holding the light sources, and the light sources are limited within the containing space, light diffusion due to the fact that the light sources are positioned outside the light guide plate is reduced, loss of light is reduced, and quantity of the light sources in the backlight module is reduced. Since the quantum dot layer is arranged in the containing space toward a direction of the light emitting surface in the example of the present invention, white mixed light is formed according to fluorescent effect of quantum dot materials. Further, as the quantum dots have the characteristics of high color gamut and high transmittance, display effect can be improved.

BRIEF DESCRIPTION OF THE DRAWINGS

FIG. 7 is a schematic diagram showing the section of part of the light guide plate of the second example of the present invention.

DETAILED DESCRIPTION

In order to make the technical problem to be solved by the examples of the present invention, technical solutions, and advantages more clear, they will be described in detail below in combination with the drawings and specific examples.

Figure 1:
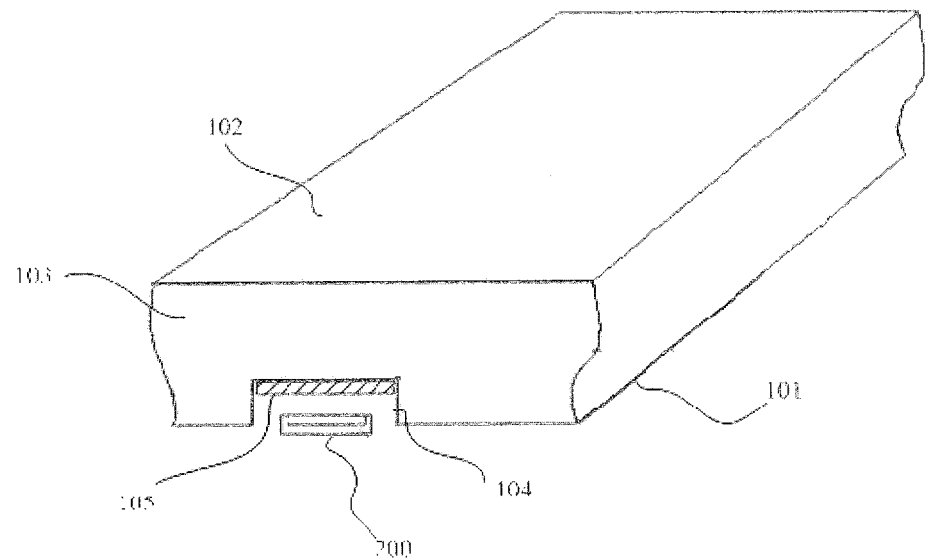
FIG. 1 is a space diagram, viewed from one direction, of the light guide plate of the first example of the present invention.
Figure 2:
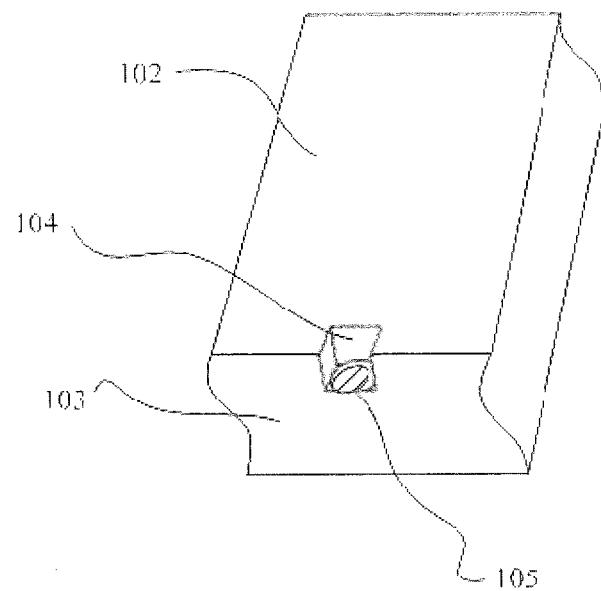
FIG. 2 is a space diagram, viewed from another direction, of the light guide plate of the first example of the present invention.

As shown in FIGS. 1 and 2, the light guide plate comprises a bottom surface 101, a light emitting surface 102 opposite to the bottom surface 101, and a first side surface 103 connecting to both the bottom surface 101 and the light emitting surface 102. Both the first side surface 103 and a second side surface (not shown in the Figs) opposite to the first side surface 103 are arranged between and connected to the bottom surface 101 and the light emitting surface 102. The bottom surface 101 is provided with at least one containing space 104 for holding light sources 200, and a quantum dot layer 105 is arranged in the containing space 104 toward a direction of the light emitting surface 102.

The number of the containing spaces 104 is set according to the required brightness of the light sources, and it may be one or more than one. Since the bottom surface of the light guide plate of this example is provided with the containing space for holding light sources, and the light sources are limited within the containing space, light diffusion due to the fact that the light sources are positioned outside the light guide plate is reduced, loss of light is reduced, and the quantity of the light sources in the backlight module is reduced. Since the quantum dot layer is arranged in the containing space toward a direction of the light emitting surface in this example, white mixed light is formed according to fluorescent effect of quantum dot materials. Further, as the quantum dots have the characteristics of high color gamut and high transmittance, display effect can be improved.

The quantum dot layer of this example is composed of quantum dot materials, and the quantum dots, which also can be called nanocrystallines, are nanoparticles formed from the chemical elements in groups II-VI or III-V. For example, the size of the quantum dots is 550 nm to 650 nm. Due to the quantum confinement effect on electrons and cavities, the continuous energy band structure becomes a discrete energy level structure with molecular characteristics which can emit fluorescence after being stimulated. Using the fluorescent effect of quantum dots, backlight may be produced. The emission spectra of quantum dots can be controlled by changing the size of the quantum dots, and the whole visible region may be covered by the emission spectra by changing the size of the quantum dots and its chemical composition.

For example, red and green quantum dot materials may be stimulated by blue light and it can be achieved by controlling the size of the quantum dots. Quantum dots have the characteristics of good light stability and long fluorescence lifetime, which also meets the requirement for the light sources of the backlight module.

For demonstration, blue light emitted from blue LED chip may be used to stimulate the red and green quantum dot materials, and white mixed light is formed according to the fluorescent effect of the quantum dot materials. As the quantum dots have the characteristics of high color gamut and high transmittance, display effect can be improved.

The red and green quantum dot materials may be sprayed onto the light guide plate, and the sprayed range may be set according to the light emitting angle of the light sources.

For example, one or more the containing spaces 104 match light sources to be placed to hold the light sources. The containing spaces may be provided at an end portion of the bottom surface. Typically, with reference to FIG. 3, the containing space 104 is provided at the edge of the bottom surface 101 and is close to the first side surface 103 to allow most of the light emitted from a light source 200 to enter the light guide plate from the first side surface 103 of the light guide plate, thereby enhancing the brightness of the end portion of the light guide plate. For example, the containing space may be located at a position where the bottom surface 101 and the first side surface 103 are connected.

For example, the containing space is provided with a convex surface in the direction facing toward the light sources, such that a portion, receiving the light emitted from the light sources, of the light guide plate, forms a convex lens structure, and after the light emitted from the light sources goes through the convex surface, divergent light will be gathered within a certain range, and this improves the brightness of the backlight module, especially the brightness of the edge of the light guide plate. When the quantum dot layer is coated on this convex surface and areas near the convex surface, it can increase the color gamut and transmittance of the light guide plate better. The light guide plate of this example can reduce the quantity of the light sources and effectively improve the uniformity of the brightness of the backlight module, without increasing its thickness.

Figure 3:
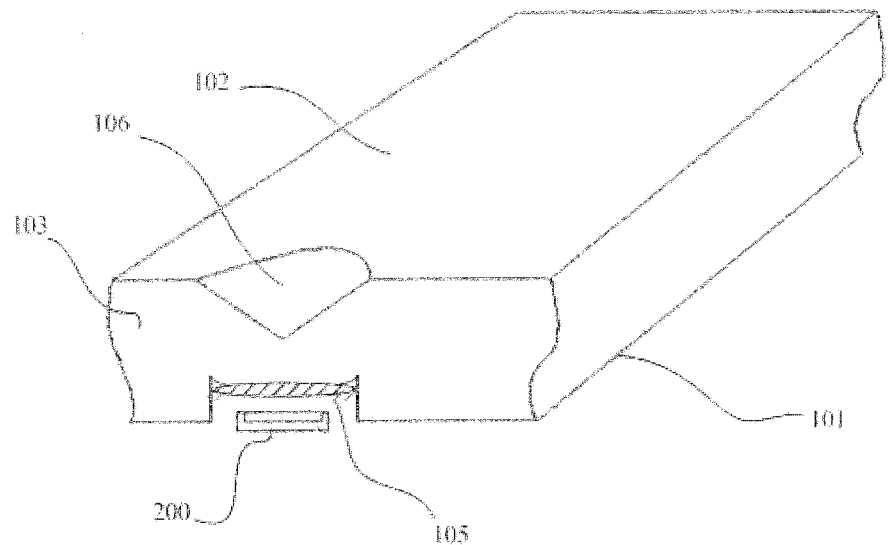
FIG. 3 is a schematic diagram showing the structure of part of the light guide plate of the second example of the present invention.
Figure 4:
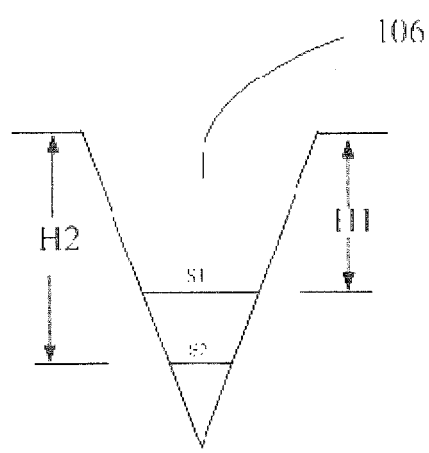
FIG. 4 is a schematic diagram showing the section of the groove of the second example of the present invention.
Figure 5:
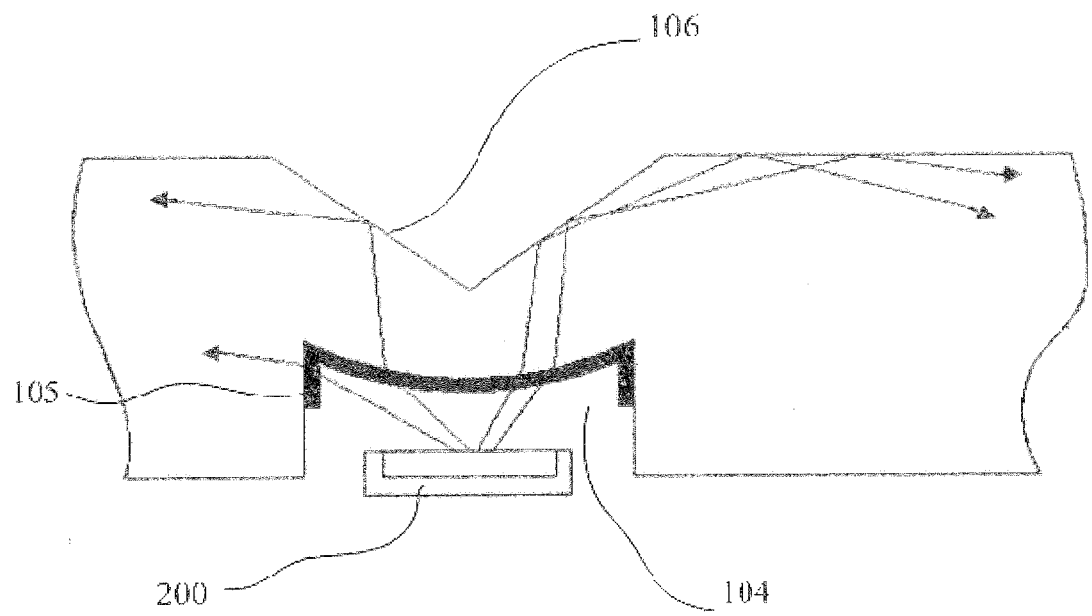
FIG. 5 is a schematic side diagram showing the structure of part of the light guide plate of the second example of the present invention.

As shown in FIGS. 3 to 5, they are the schematic diagrams showing the structure of the second example of the present invention. This example is basically the same as the first one, and their difference is that: the light emitting surface 102 is provided with a groove 106 at a position opposite to the containing space 104, and the groove 106 is in the same vertical line with the containing space 104. For example, the sectional area of the groove 106 at a position close to the light emitting surface 102 is larger than its sectional area at a position far away from the light emitting surface 102, and thus the opening of the groove 106 facing toward the light emitting surface 102 gradually increases.

As shown in FIG. 4, the groove 106 comprises a first height H1 close to the light emitting surface 102 and a second height H2 far away from the light emitting surface, and the sectional area S1 of the groove 106 at the first height H1 is larger than its sectional area S2 at the second height H2, which makes the sectional area of the groove 106 at a position close to the light emitting surface 102 larger than its sectional area at a position far away from the light emitting surface 102.

The section of the groove may be an inverted triangle or inverted trapezoid. For example, the groove is in the form of an inverted cone and its section is a triangle, and the bottom surface of the inverted-conical groove faces toward the light emitting surface and the cone top faces toward the bottom surface. As shown in FIG. 5, the projection area of the convex surface of the containing space 104 is smaller than or equal to the projection area of the groove 106 on the light emitting surface, which makes all possible light gathered through the convex surface enter the groove 106. After the light emitted from the light source 200 goes through the convex surface, the divergent light is gathered in a certain range to be incident on the inverted-conical groove 106. Due to the fact that the side surface of the inverted-conical groove is an inclined plane and the projection area of the convex surface is smaller than or equal to the projection area of the groove 106 on the light emitting surface, light emitted from the light sources gathers toward the light emitting surface, and then diffuses around evenly through the groove 106 on the light emitting surface, and the uniformity of the brightness of the light sources is improved.

Figure 6:
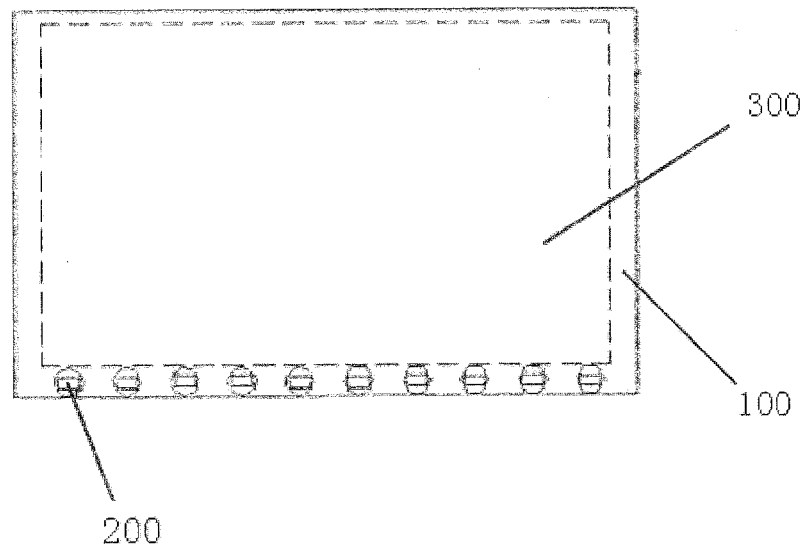
FIG. 6 is a schematic diagram showing the structure of the display device of an example according to the present invention.

As shown in FIG. 6, the display device comprises a light guide plate 100, light sources 200, and a display panel 300 (as shown in the dotted part in this figure). The bottom surface of the light guide plate 100 is provide with a row of containing spaces for holding the light sources 200 at its end portion close to the side surface, and the display panel 300 is arranged in the light exit direction of the light guide plate 100. The light guide plate 100 of the example of the present invention is made of polymethylmethacrylate (PMMA) or polyethylene terephthalate (PET) material, with a thickness of 2 to 10 mm. Several light sources 200 are provided under the light guide plate 100, and they are arranged at the end portion of the bottom surface. The display panel 300 is arranged in the light exit direction of the light guide plate 100 for receiving light emitted from the light sources 200.

As shown in FIG. 7, for example, the height of the first side surface of the light guide plate is 5.00 mm, and the surface, facing toward the light emitting surface, of the containing space 104 of the light guide plate, is a spherical crown surface which is a part of the spherical surface. The diameter of the spherical surface is 5 to 15 mm, which is 10 mm in this example, and the height of the spherical crown is 1 to 3 mm, which is 2.00 mm in this example. The portion, facing the light emitting surface, of the containing space 104, actually constitutes a convex lens structure having the function of gathering light. The bottom surface of the spherical crown has a radius of 2 to 8 mm, and it is 4.00 mm in this example. The distance from the deepest point in the containing space 104 to the bottom surface of the light guide plate is 2 to 8 mm, and it is 4.00 mm in this example. The groove 106 is in the form of an inverted cone, and the cone has a bottom radius of 2 to 8 mm and is 1 to 4 mm high. The bottom radius is 4.00 mm and the cone is 2.00 mm high in this example.

The light sources 200 may be a LED lamp or other various suitable light sources, and the thickness of the LED lamp is 0.5 to 1 mm, and it is 0.80 mm in this example.

The example of the present invention further discloses a backlight module, comprising the light guide plate as described above, and light sources which are held in the containing space on the bottom surface of the light guide plate.

The example of the present invention further discloses a display device, comprising the backlight module as described above, and a display panel which is arranged in the light exit direction of the light guide plate in the backlight module.

The display device may be any product or component having the display function, such as a liquid crystal panel, electronic paper, an organic light-emitting diode (GELD) display panel, a liquid crystal television, a liquid crystal display, a digital photo frame, a mobile phone, and a tablet computer.

Using the above technical solutions, the bottom surface is provided with a containing space for holding light sources, and the light sources are limited within the containing space, and thus light diffusion due to the fact that the light sources are positioned outside the light guide plate is reduced, loss of light is reduced, and quantity of the light sources in the backlight module is reduced. Since a quantum dot layer is arranged in the containing space toward a direction of the light emitting surface in the example of the present invention, white mixed light is formed according to fluorescent effect of quantum dot materials. Further, as the quantum dots have the characteristics of high color gamut and high transmittance, display effect can be improved.

The above are the various embodiments of the present invention. It shall be noted that, to a person skilled in the art, several improvements and modifications may be made without departing from the principle of the examples of the present invention, and they shall be also regarded as the protection scope of the examples of the present invention.

What is claimed is:

1. A light guide plate comprising a bottom surface and a light emitting surface opposite to the bottom surface, wherein the bottom surface is provided with a containing space for holding light sources;
   wherein the light guide plate further comprises a convex lens structure in the containing space and having function of gathering light;
   wherein the convex lens structure has a convex surface which is convex towards the bottom surface;
   wherein the light guide plate further comprises a quantum dot layer in the containing space, the quantum dot layer is coated on the convex surface of the convex lens structure and areas around the convex surface of the convex lens structure.

2. The light guide plate according to claim 1, wherein the light emitting surface is provided with a groove at a position opposite to the containing space, and the sectional area of the groove at a position close to the light emitting surface is larger than the groove's sectional area at a position far away from the light emitting surface.

3. The light guide plate according to claim 2, wherein the groove is in the form of an inverted cone and the bottom surface of the inverted-conical groove is close to the light emitting surface.

4. The light guide plate according to claim 2, wherein a projection area of the convex surface on the bottom surface is smaller than or equal to a projection area of the groove on the bottom surface.

5. The light guide plate according to claim 1, wherein the containing space is located at an end portion of the bottom surface.

6. The light guide plate according to claim 1, wherein the light guide plate further comprises a first side surface which is connected to both the light emitting surface and the bottom surface, and the containing space is located at a position where the bottom surface and the first side surface are connected.

7. The light guide plate according to claim 1, wherein the size of quantum dots in the quantum dot layer is 550 nm to 650 nm.

8. A backlight module, comprising the light guide plate according to claim 1, and light sources which are held in the containing space on the bottom surface of the light guide plate.

9. The backlight module according to claim 8, wherein the light emitting surface of the light guide plate is provided with a groove at a position opposite to the containing space, and the sectional area of the groove at a position close to the light emitting surface is larger than the groove's sectional area at a position far away from the light emitting surface.

10. The backlight module according to claim 9, wherein the groove is in the form of an inverted cone and the bottom surface of the inverted-conical groove is close to the light emitting surface.

11. The backlight module according to claim 9, wherein a projection area of the convex surface on the bottom surface is smaller than or equal to a projection area of the groove on the bottom surface.

12. The backlight module according to claim 8, wherein the containing space is located at an end portion of the bottom surface.

13. The backlight module according to claim 8, wherein the light guide plate further comprises a first side surface which is connected to both the light emitting surface and the bottom surface, and the containing space is located at a position where the bottom surface and the first side surface are connected.

14. The backlight module according to claim 8, wherein the size of quantum dots in the quantum dot layer is 550 nm to 650 nm.

15. A display device, comprising the backlight module according to claim 8, and a display panel which is arranged in the light exit direction of the light guide plate in the backlight module.

16. The backlight module according to claim 8, wherein the light sources are within the containing space and face the quantum dot layer coated on the convex surface of the convex lens structure; the light sources are spaced from the quantum dot layer coated on the convex surface of the convex lens structure.

17. The backlight module according to claim 8, wherein the backlight module is a side-type backlight module.

18. The light guide plate according to claim 1, wherein the light guide plate further comprises a first side surface which is connected to both the light emitting surface and the bottom surface, and the containing space is located at a junction between the bottom surface and the first side surface.

19. A display device, comprising:
- a light guide plate having a top surface, a bottom surface and a plurality of containing spaces defined in the bottom surface;
- at least one light source within each of the plurality of containing spaces; and
- a display panel in front of the top surface;
- wherein the pluralities of containing spaces are arranged into only one row which is at a lateral side of the display panel;
- wherein the light guide plate further comprises a convex lens structure in each of the plurality of containing spaces and having function of gathering light from the at least one light source;
- wherein the convex lens structure has a convex surface which is convex towards the bottom surface;
- wherein the light guide plate further comprises a quantum dot layer in the containing space, the quantum dot layer is coated on the convex surface of the convex lens structure and areas around the convex surface of the convex lens structure.

20. The display device according to claim 19, wherein the at least one light source within each of the plurality of containing spaces faces and are spaced from the quantum dot layer.

* * * * *